United States Patent
Miyazaki et al.

(10) Patent No.: US 9,932,082 B2
(45) Date of Patent: Apr. 3, 2018

(54) BICYCLE HANDLEBAR

(71) Applicant: Shimano Inc., Sakai, Osaka (JP)

(72) Inventors: Kentaro Miyazaki, Sakai (JP); Yoshimitsu Miki, Sakai (JP); Kazutaka Fukao, Sakai (JP); Kentaro Kosaka, Sakai (JP)

(73) Assignee: SHIMANO INC., Osaka (JP)

( * ) Notice: Subject to any disclaimer, the term of this patent is extended or adjusted under 35 U.S.C. 154(b) by 0 days.

(21) Appl. No.: 14/284,412

(22) Filed: May 22, 2014

(65) Prior Publication Data

US 2015/0336628 A1 Nov. 26, 2015

(51) Int. Cl.
*B62K 21/26* (2006.01)
*B62K 21/16* (2006.01)
*B62K 23/06* (2006.01)

(52) U.S. Cl.
CPC .............. *B62K 21/16* (2013.01); *B62K 21/26* (2013.01); *B62K 23/06* (2013.01); *Y10T 74/20828* (2015.01)

(58) Field of Classification Search
CPC ............ F16C 1/26; B62K 21/12; B62K 23/04
USPC ....................................................... 74/551.9
See application file for complete search history.

(56) References Cited

U.S. PATENT DOCUMENTS

| | | | | |
|---|---|---|---|---|
| 4,252,290 A | * | 2/1981 | Willey | .......................... 248/549 |
| 5,370,017 A | * | 12/1994 | Krauer | ................... B62K 23/04 |
| | | | | 474/80 |
| 5,775,168 A | * | 7/1998 | Furuta | .................... B62K 23/02 |
| | | | | 74/489 |
| 2011/0132128 A1 | * | 6/2011 | Sato | ....................... B62K 23/04 |
| | | | | 74/489 |

FOREIGN PATENT DOCUMENTS

| | | | | |
|---|---|---|---|---|
| CN | 201737114 U | | 2/2011 | |
| DE | 19538576 A1 | * | 3/1996 | |
| DE | 102168 A1 | * | 10/2003 | ............. B62K 23/04 |
| DE | 202012104753 U | | 5/2013 | |
| GB | 190914554 A | | 3/1910 | |
| GB | 981440 A | * | 1/1965 | ............ B62M 25/00 |
| KR | 2010041065 A | * | 4/2010 | |

OTHER PUBLICATIONS

KR 2010041065 translation.*

* cited by examiner

Primary Examiner — Vicky A Johnson

(57) ABSTRACT

A bicycle handlebar includes a base portion that can be coupled to a bicycle, a gripping portion that is rotatably coupled to the base portion, and a mounting portion to which an operating member that operates a component of the bicycle is mounted. The mounting portion is rotatable together with the gripping portion.

12 Claims, 7 Drawing Sheets

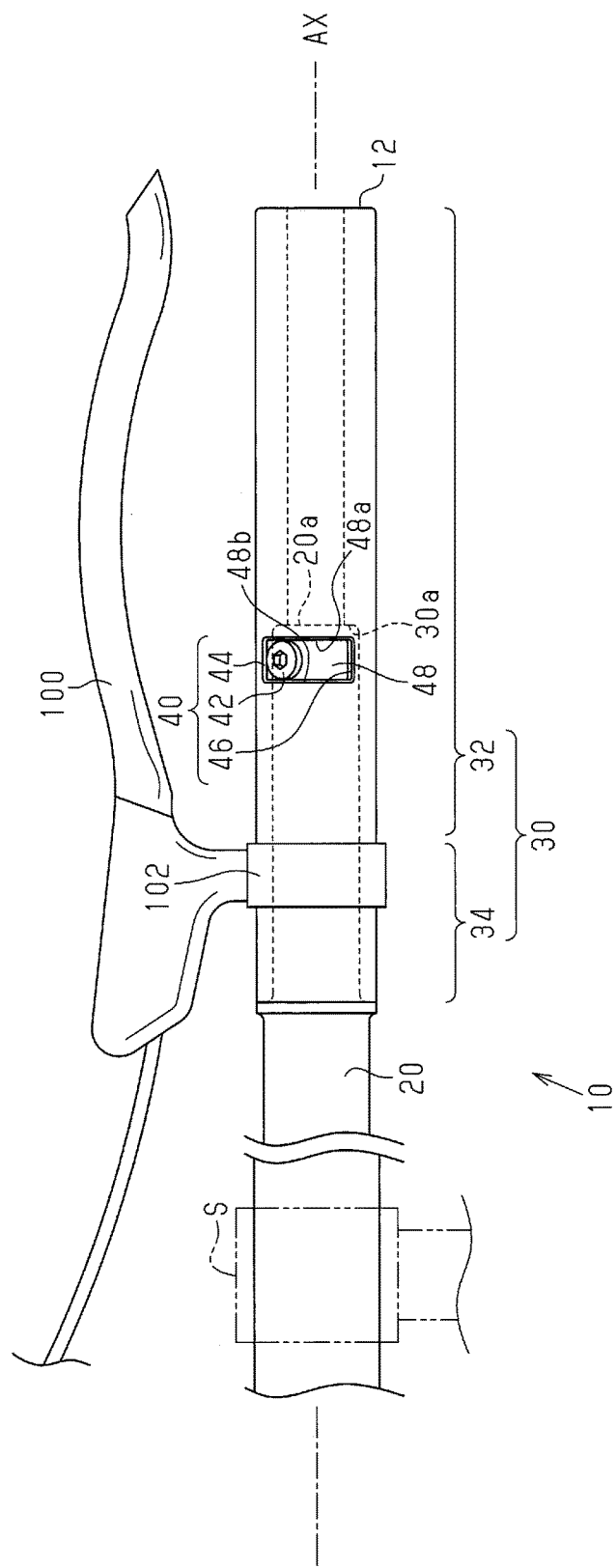

BICYCLE HANDLEBAR

TECHNICAL FIELD

The present disclosure relates to bicycle handlebars.

BACKGROUND ART

A bicycle includes a handlebar that allows a rider to steer the bicycle. A typical handlebar includes two gripping portions and a center portion, which is located between the two gripping portions and fixed to a stem. An operating member such as a brake lever or a shifter that operates or actuates bicycle components such as a brake or a derailleur is mounted to the handlebar.

SUMMARY

The gripping posture of a rider with respect to the handlebar may differ depending on the riding condition (standing/sitting, gradient, traveling speed, etc.). Since the conventional handlebar is fixed to the stem, the positional relationship of an operations member, such as a brake lever, and the hand of the rider changes when the user rides the bicycle. The operating member is fixed to the handlebar at a position that is suitable for the rider (i.e., easy to operate) during normal riding. Nevertheless, the inventors of the present invention have noticed that the operating member becomes difficult to operate when the rider changes the gripping posture.

One aspect of the present disclosure is a bicycle handlebar including a base portion configured to be coupled to a bicycle, a gripping portion configured to be rotatably coupled to the base portion, and a mounting portion to which an operating member that operates a component of the bicycle is mounted. The mounting portion is rotatable together with the gripping portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic diagram of a handlebar according to a first embodiment;

FIG. 7 shows a stopper surface contacts a projection, and FIG. 8 shows another stopper surface contacts the projection;

DESCRIPTION OF EMBODIMENTS

Figure 2A:
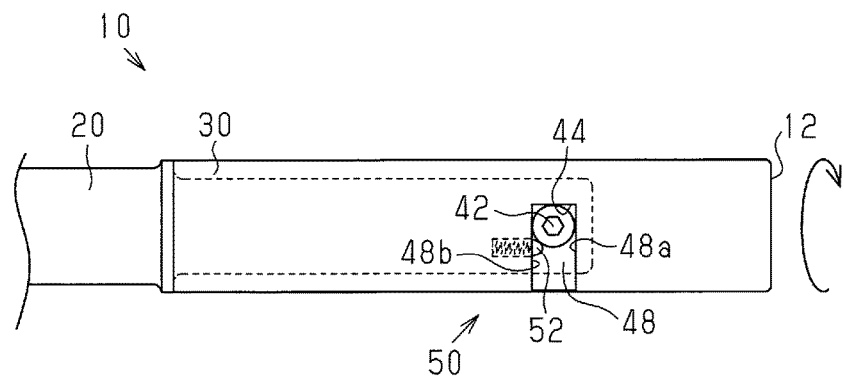
FIGS. 2A, 2B, and 2C are schematic diagrams of a positioning mechanism.

A bicycle handlebar 10 according to a first embodiment of the present disclosure will now be described. FIG. 1 shows the right half of the handlebar 10. Since the right half and the left half of the handlebar 10 have substantially the same structure, the right half will be described in the description hereafter, and the left half will neither be illustrated nor described.

The handlebar 10 includes a base portion 20, which can be coupled to a bicycle, a gripping portion 32, which is rotatably coupled to the base portion 20, and a mounting portion 34 to which an operating member that may be used to operate a component of the bicycle is mounted. The mounting portion 34 is rotatable together with the gripping portion 32. In the illustrated example, the operating member includes, for example, a brake lever 100.

The base portion 20 is an elongated member including a center portion, or a bar clamp. The base portion 20 is fixed to a bicycle steering tube by a stem S, for example. The base portion 20 is, for example, a hollow body, although not particularly limited.

In the illustrated example, the base portion 20 includes a flange 24 and a stationary or non-rotatable inner member 26, which extends from the flange 24 in the axial direction and functions as a support for supporting the gripping portion 32 and the mounting portion 34 from the inner side in the radial direction. Preferably, the non-rotatable inner member 26 is a hollow cylindrical tube but may be a solid cylindrical rod.

The gripping portion 32 includes part of a sleeve, or a rotatable outer member 30. The mounting portion 34 includes another part of the outer circumferential surface of the rotatable outer member 30. The mounting portion 34 has an axial length that can support the brake lever 100 or at least one other operating member in an operable manner. The rotatable outer member 30, which includes the gripping portion 32 and the mounting portion 34, is coupled coaxially to the non-rotatable inner member 26 of the base portion 20 and rotates about a rotational axis AX relative to the base portion 20. For example, the rotatable outer member 30 includes an inner end 30b that may abut axially against the flange 24 of the base portion 20. The base portion 20 may be coupled to the stem S so that rotation of the base portion 20 is disabled about the rotational axis AX.

As shown in FIG. 1, a brake lever assembly including the brake lever 100 and a clamp 102 is fixed to the handlebar 10. The brake lever 100 is shifted between a non-actuated condition in which the brake lever 100 is not operated by the rider and an actuated condition in which the brake lever 100 is operated by the rider. Generally, the brake lever 100 is fixed to the mounting portion 34 by the clamp 102 of the brake lever assembly at a position and an angle suitable for the rider (easy to operate) during normal riding. The brake lever assembly is one example of an operating member, and the clamp 102 is one example of a fixing member used to fix the operating member to the handlebar 10. The brake lever assembly is one example of a bicycle component operating device.

When the clamp 102 of the brake lever assembly is fixed to the mounting portion 34, the brake lever 100 is supported by the clamp 102 on the mounting portion 34 so that the brake lever 100 can be operated. In this structure, the gripping portion 32 and the mounting portion 34 may be rotated independently of the operation of the brake lever 100. For example, the gripping portion 32 and the mounting portion 34 may be rotated while maintaining the brake lever 100 in the non-actuated condition or while maintaining the brake lever 100 in the actuated condition. Further, when the brake lever 100 is being operated from the non-actuated condition to the actuated condition, the gripping portion 32 and the mounting portion 34 may be rotated.

As shown in FIG. 1, the handlebar 10 may include a rotational restriction unit 40 that restricts the rotational angle of the gripping portion 32 relative to the base portion 20 to within a predetermined range. The rotational restriction unit 40 may include a first engagement portion, which is arranged on a first member that is one of the non-rotatable inner member 26 and the rotatable outer member 30, and a second engagement portion, which is arranged on a second member that is the other one of the non-rotatable inner member 26 and the rotatable outer member 30. The second engagement portion abuts against the first engagement portion when the gripping portion 32 rotates and restricts further rotation of the gripping portion 32 and the mounting portion 34. When the first engagement portion is arranged on the base portion 20, the second engagement portion is arranged on the gripping portion 32 or the mounting portion 34. The rotational restriction unit 40 permits rotation of the gripping portion 32 and the mounting portion 34 until the first and second engagement portions abut against each other and restricts rotation of the gripping portion 32 and the mounting portion 34 when the first and second engagement portions abut against each other. A predetermined range for the rotational angle of the gripping portion 32 relative to the base portion 20 is not particularly limited and may be set in accordance with the type and application of the bicycle. For example, the predetermined range of the rotational angle may be approximately ninety degrees.

In one example, the first engagement portion is a projection 42, and the second engagement portion includes a plurality of stopper surfaces 44 and 46 that contact the projection 42 when the gripping portion 32 is rotated. The stopper surfaces 44 and 46 may include, for example, the first stopper surface 44 that contact the projection 42 when the gripping portion 32 is located at the initial position and the second stopper surface 46 that is separated from the first stopper surface 44 by a predetermined distance in the rotation direction of the gripping portion 32. In this structure, the gripping portion 32 and the mounting portion 34 are rotated relative to the base portion 20 in a range corresponding to the distance from the first stopper surface 44 to the second stopper surface 46.

In the illustrated example, the projection 42 is the head of a bolt or pin projecting outward in the radial direction from the base portion 20. The projection 42 is guided by a guide 48 formed in the gripping portion 32 or the mounting portion 34. The guide 48 is a slot-like guide passage that extends in the rotation direction of the gripping portion 32. Further, the guide 48 can accommodate the projection 42.

In another example, the projection 42 projects inward in the radial direction from the inner circumferential surface of the gripping portion 32 or the mounting portion 34 and is guided by, for example, a guide 48 such as a slot-like guide passage located in the base portion 20. In this example, the projection 42 may be the distal end of a bolt or pin inserted inward from the outer circumferential surface of the gripping portion 32. In any of these examples, the projection 42 and the guide 48 may relatively move in the rotation direction of the gripping portion 32.

The guide 48 may include two end surfaces that are parallel to the rotational axis AX. The two end surfaces may function as the first and second stopper surfaces 44 and 46. The distance between the two end surfaces, that is, the length of the guide 48 in the rotation direction of the gripping portion 32 may be set in accordance with the rotatable angle of the gripping portion 32 relative to the base portion 20.

In the example illustrated in FIG. 1, the projection 42 and the guide 48 are formed so that movement relative to each other in the direction of the rotational axis AX is substantially disabled. For example, the guide 48 includes two guide surfaces 48a and 48b that are perpendicular to or intersect the rotational axis AX. The distance between the guide surfaces 48a and 48b are substantially the same or slightly larger than the size of the projection 42 along the rotational axis AX. This structure is preferred when stabilizing the rotation of the gripping portion 32 relative to the base portion 20. Further, the projection 42 and the guide 48 contribute to restricting movement of the gripping portion 32 relative to the base portion 20 in the axial direction and to limiting removal of the gripping portion 32 from the base portion 20.

The inner end 30b of the rotatable outer member 30 may abut axially against the flange 24 of the base portion 20. The inner circumference of the rotatable outer member 30 may include a positioning step 30a that abuts axially against the distal end 20a of the base portion 20. The flange 24 and/or the positioning step 30a restrict movement of the gripping portion 32 toward the bar clamp in the axial direction. Further, the flange 24 and/or the positioning step 30a contribute to stabilizing the rotation of the gripping portion 32 relative to the base portion 20.

Figure 2B:
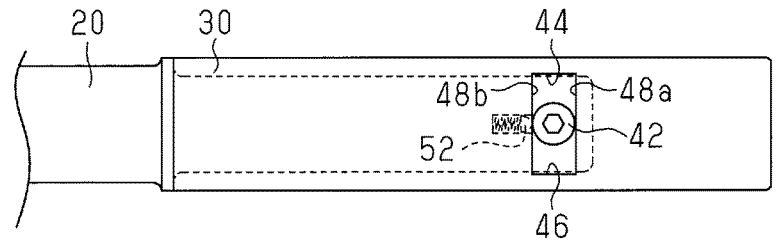
Figure 2C:
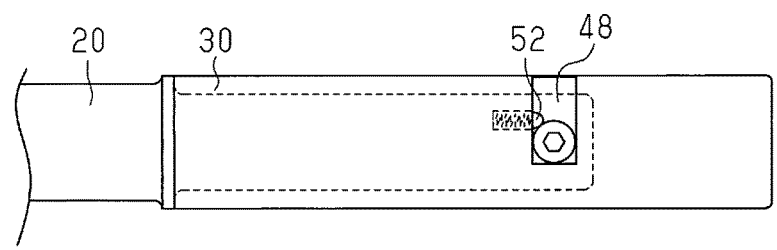

As shown in FIGS. 2A to 2C, the handlebar 10 may include a positioning mechanism 50 that positions the gripping portion 32 and the mounting portion 34 relative to the base portion 20 about the rotational axis AX. For example, the positioning mechanism 50 includes a positioner 52 that positions the projection 42 at a predetermined position in the guide 48. The positioner 52 is, for example, a ball detent and movable in the longitudinal direction of the handlebar 10 between a first position, which may be a projected position as shown in FIGS. 2A and 2C, and a second position, which may be a retracted position as shown in FIG. 2B. The positioner 52 positions the projection 42 when located at the first position. The positioner 52 permits movement of the projection 42 relative to the guide 48 when located at the second position. The positioner 52, which is biased by an elastic member such as a coil spring to be located at the first position, is pushed to the second position by the projection 42 when the gripping portion 32 moves. When located at the second position, the positioner 52 may be partially exposed from the guide 48.

In the illustrated example, the positioner 52 positions the projection 42 at a first predetermined position (FIG. 2A) where the projection 42 contacts the first stopper surface 44. Further, the projection 42 positions the projection 42 at a second predetermined position (FIG. 2C) where the projection 42 contacts the second stopper surface 46. When the projection 42 is located at the first predetermined position, the positioner 52 sandwiches the projection 42 with the first stopper surface 44. When the projection 42 is located at the second predetermined position, the positioner 52 sandwiches the projection 42 with the second stopper surface 46. Preferably, at least one of the positioner 52 and the projection 42 has a curved contact surface. The curved contact surface aids movement of the positioner 52 between the first position and the second position while sliding on the projection 42 as the gripping portion 32 rotates.

In this structure, the gripping portion 32 and the mounting portion 34 do not rotate relative to the base portion 20 when the gripping portion 32 does not receive a rotation force exceeding the biasing force of the positioner 52. The gripping portion 32 and the mounting portion 34 may be rotated relative to the base portion 20 when the gripping portion 32 receives a rotation force exceeding the biasing force of the positioner 52.

In one example, when the rider is in a sitting posture, the gripping portion 32 and the mounting portion 34 are positioned at the first predetermined position (FIG. 2A) by the gripping portion 32 and the mounting portion 34. When the rider shifts from a sitting posture to a standing posture while gripping the gripping portion 32, the rider rotates the gripping portion 32 and the mounting portion 34 in the clockwise direction as viewed from the right end 12 of the handlebar 10. As the gripping portion 32 and the mounting portion 34 rotate, the projection 42 moves the positioner 52 to the second position. When the projection 42 reaches the second predetermined position (FIG. 2C), the positioner 52 moves to the first position. The positioner 52 pushes the projection 42 toward the second stopper surface 46. In this manner, the gripping portion 32 and the mounting portion 34 are positioned at the second predetermined position.

For example, when the rider shifts from a standing position to a sitting posture while gripping the gripping portion, the gripping portion 32 and the mounting portion 34 rotate in the counterclockwise direction as viewed from the right end 12 of the handlebar 10. In this case, the projection 42 moves the positioner 52 to the second position. When the projection 42 reaches the first predetermined position, the positioner 52 moves to the first position, and the positioner 52 pushes the projection 42 toward the first stopper surface 44. In this manner, the gripping portion 32 and the mounting portion 34 are positioned at the first predetermined position (FIG. 2A). Further, when the positioner 52 is returned from the second position to the first position by a biasing force, as the gripping portion 32 rotates, the handlebar 10 produces a rotation resistance change that is perceived by the rider as a clicking feedback.

A method for assembling the handlebar 10 will now be described. First, the non-rotatable inner member 26 of the base portion 20 is inserted into the rotatable outer member 30, which includes the gripping portion 32 and the mounting portion 34. When necessary, refer to FIG. 3. Under this situation, the projection 42 is coupled from the outer side of the rotatable outer member 30 so that the projection 42 is accommodated in the guide 48. The handlebar 10 is assembled in this manner.

Then, the clamp 102 of the brake lever assembly is fixed to the mounting portion 34 so that the brake lever 100 is located at a position suitable for the rider (easy to operate) during normal riding. When necessary, the gripping portion 32 may be covered by a cover member or a skin member.

The first embodiment has the advantages described below.

In the handlebar 10 of the first embodiment, the mounting portion 34 is integrally arranged with the gripping portion 32, and the mounting portion 34 is rotatable together with the gripping portion 32 relative to the base portion 20. In this structure, the mounting portion 34 and the brake lever 100 are rotatable together with the gripping portion 32 relative to the base portion 20. For example, the rider may rotate the gripping portion 32 together with the mounting portion 34 and the brake lever 100 without releasing his or hand from the gripping portion 32 or without weakening the grip on gripping portion 32. In a non-restrictive example, the brake lever 100 is fixed to the mounting portion 34 at a position and angle suitable for the rider (easy to operate) when in a sitting posture. Here, the angle of the wrist of the rider relative to the brake lever 100 is referred to as a first angle. When the rider rides the bicycle and shifts from a sitting posture to a standing posture while gripping the gripping portion 32, the mounting portion 34 and the brake lever 100 rotate together with the gripping portion 32. The positional relationship between the brake lever 100 and the hand of the rider does not change before and after shifting between the sitting posture and the standing posture. For example, when the rider is in a standing posture, the brake lever 100 may be operated while maintaining the angle of the wrist relative to the brake lever 100 at the same first angle as when in the sitting posture. The handlebar 10 of the first embodiment is also preferred for a case in which the rider shifts to a posture other than the sitting posture or the standing posture, such as when the rider crouches forward in the sitting posture. Accordingly, the brake lever 100 may be operated at a suitable position in the same manner regardless of whether the rider is standing or sitting.

Figure 3:
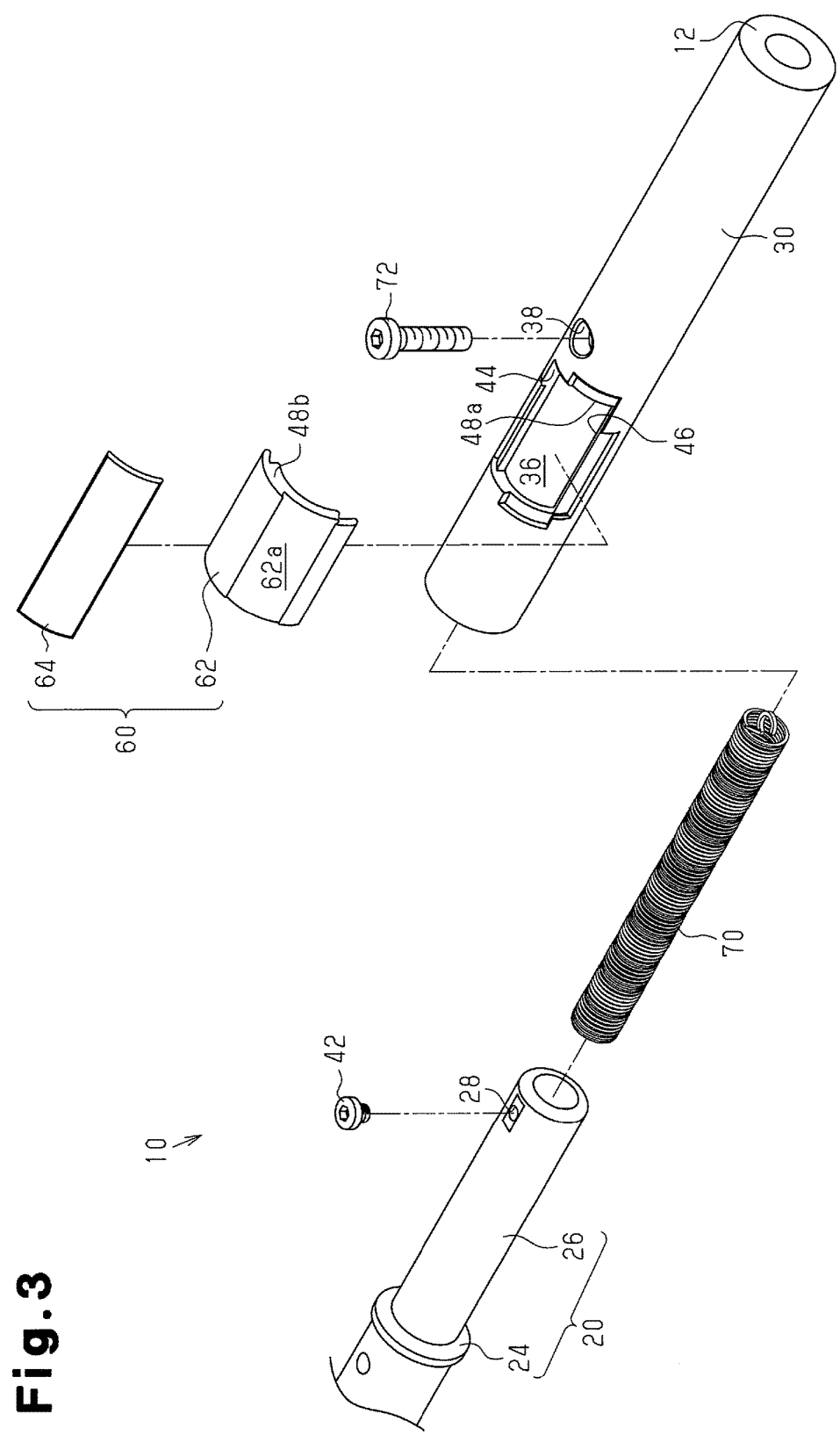
FIG. 3 is an exploded perspective view of a handlebar according to a second embodiment.
Figure 9:
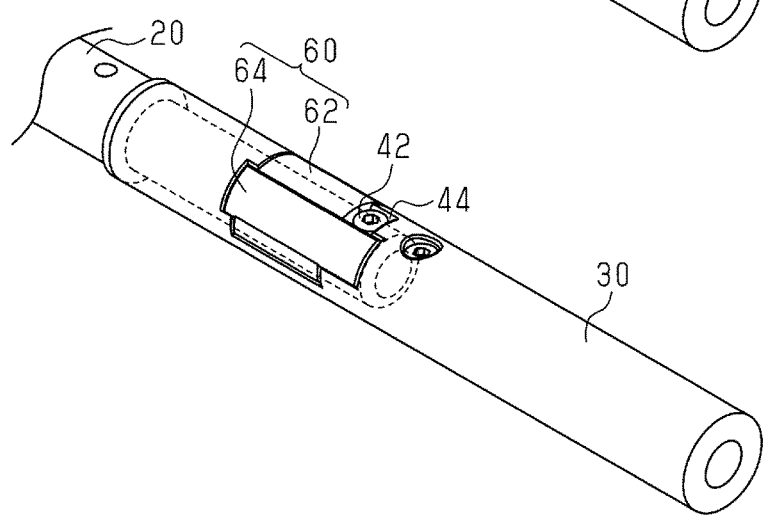
FIG. 9 is a perspective view of the handlebar when a restriction member restricts rotation of the gripping portion and the mounting portion relative to the base portion.

Referring to FIGS. 3 and 9, a bicycle handlebar 10 according to a second embodiment of the present disclosure will now be described focusing on the differences from the first embodiment. Same reference numerals are given to those components that are the same as the corresponding components of the first embodiment. Such components will not be described in detail.

As shown in FIG. 3, the handlebar 10 includes a restriction member 60 and a coil spring 70. The restriction member 60 is detachably engaged with the rotatable outer member 30. The coil spring 70 is arranged between the base portion 20 and the rotatable outer member 30.

The projection 42 may be the head of a bolt. The bolt is fastened to a threaded hole 28 formed in the non-rotatable inner member 26 and projected from the non-rotatable inner member 26 in the radial direction. In the illustrated example, the head of the bolt includes a hexagonal socket.

The rotatable outer member 30 includes an opening 36 of a predetermined shape in which the projection 42 is arranged. When the rotatable outer member 30 is supported by the non-rotatable inner member 26, the bolt is fastened to the threaded hole 28 through the opening 36. The opening 36 is defined by first and second stopper surfaces 44 and 46, which are substantially parallel to the rotational axis AX, and opening edges including a guide surface 48a that is substantially perpendicular to the rotational axis AX.

Figure 7:
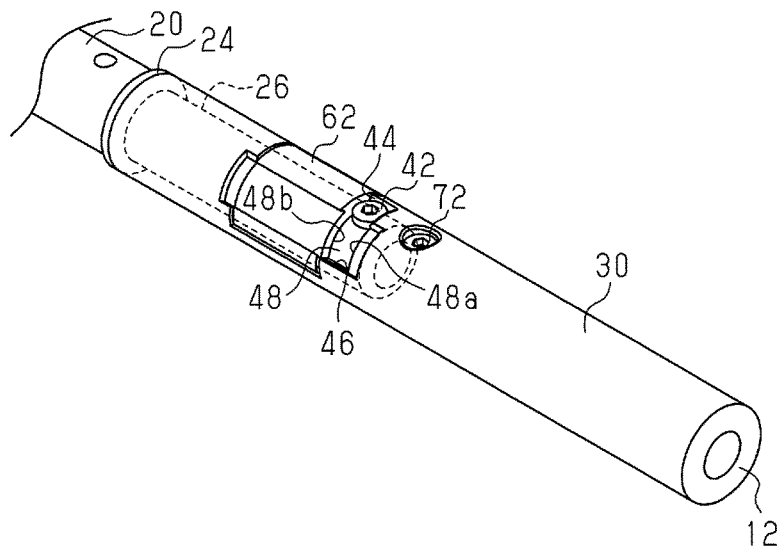
FIGS. 7 and 8 are perspective views of the handlebar illustrating rotation of a gripping portion and a mounting portion relative to the base portion, where

The restriction member 60 includes first and second attachments 62 and 64, each of which is a curved plate-like member detachably engaged with the opening 36. The first attachment 62 is shaped to partially cover the opening 36 of the rotatable outer member 30. The first attachment 62 forms the guide 48 (FIG. 7) with the opening 36 of the rotatable outer member 30. Referring to FIGS. 3 and 7, when the first attachment 62 is fitted to the rotatable outer member 30, a first end surface of the first attachment 62 functions as a guide surface 48b that is substantially parallel to the guide surface 48a of the rotatable outer member 30 and separated from the guide surface 48a in the direction of the rotational axis AX. The guide surface 48b of the first attachment 62 and the guide surface 48a of the rotatable outer member 30 define a slot-like guide passage that extends in the rotation direction of the gripping portion 32.

The second attachment 64 holds the projection 42 in an immovable manner together with the first attachment 62 and the opening 36 of the rotatable outer member 30. Under this situation, the rotation of the gripping portion 32 relative to the base portion 20 is restricted, and movement of the gripping portion 32 in the axial direction is also restricted. In this manner, the first and second attachments 62 and 64 switch the gripping portion 32 between a rotatable state and a non-rotatable state.

Preferably, the first attachment 62 includes an engagement groove 62a, the inner side of which is engaged with the second attachment 64. When the second attachment 64 is engaged with the first attachment 62, the curved outer surfaces of the first attachment 62 and the second attachment 64 are substantially flush with the outer surface of the rotatable outer member 30.

Figure 4:
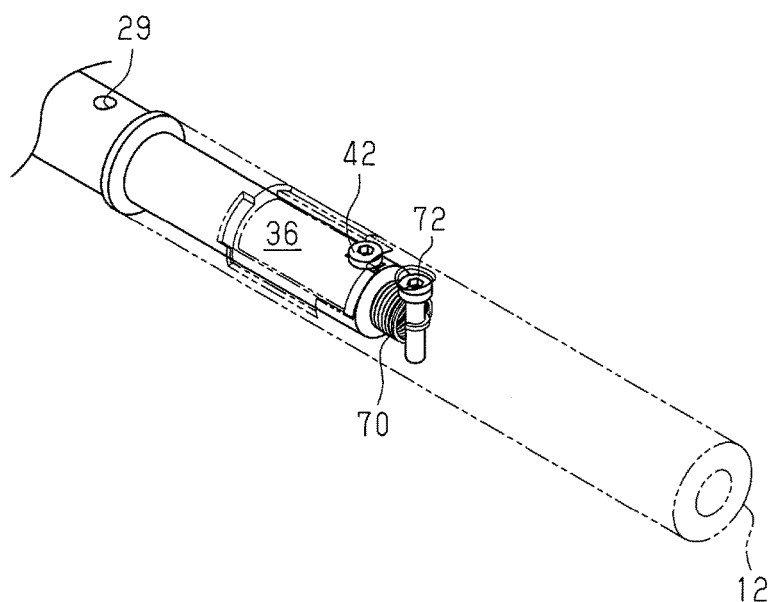
FIG. 4 is a perspective view of the handlebar of FIG. 3 transparently shown in part.
Figure 5:
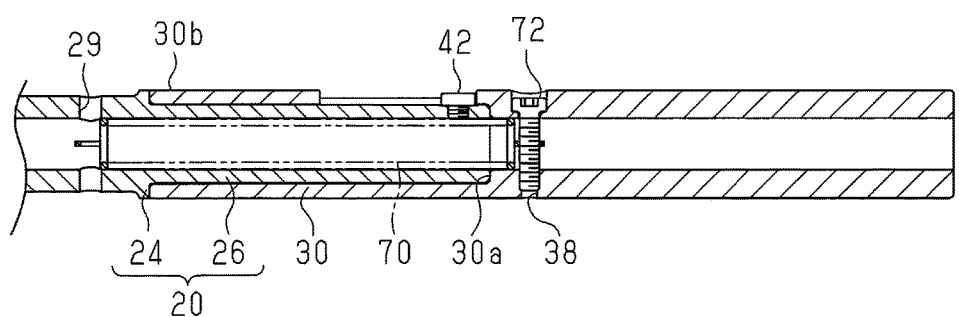
FIG. 5 is a cross-sectional view of the handlebar of FIG. 4.
Figure 6:
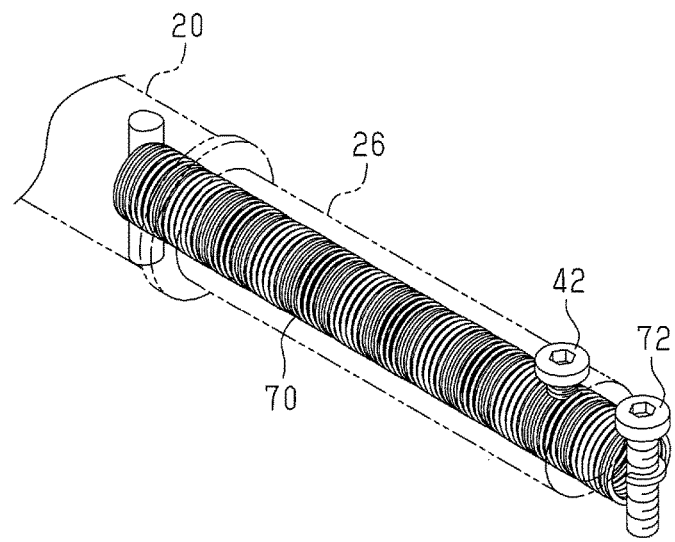
FIG. 6 is a perspective view of a coil spring.

The coil spring 70 is arranged inside the base portion 20. This allows the coil spring 70 to be arranged without extending the handlebar in the axial direction. As shown in FIGS. 4 to 6, the outer end, or distal end, of the coil spring 70 is coupled to a distal bolt 72, which is fixed to a through hole 38 formed in the rotatable outer member 30. The inner end, or basal end, of the coil spring 70 is coupled to a basal bolt (not shown) which is fixed to a through hole 29 formed in the base portion 20. The rotatable outer member 30, the non-rotatable inner member 26, and the coil spring 70 are arranged to be substantially coaxial.

In the illustrated example, the coil spring 70 is placed in a twisted state in the base portion 20 to function as a torsion spring. Accordingly, the single coil spring 70 biases the gripping portion 32 relative to the base portion 20 in a direction that decreases the overall length of the handlebar 10. Further, the gripping portion 32 may be biased about the rotation shaft AX relative to the base portion 20.

Figure 8:
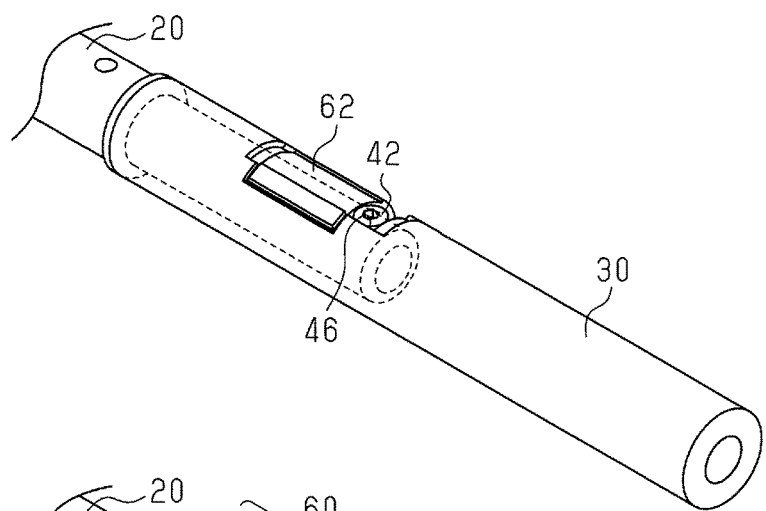

Preferably, the coil spring 70 biases the gripping portion 32 and the mounting portion 34 relative to the base portion 20 in the counterclockwise direction as viewed in an axial direction from the right end 12 of the handlebar 10. In the example shown in FIGS. 4 and 7, when the first stopper surface 44 contacts the projection 42, the gripping portion 32 is in the initial position. The coil spring 70 biases the gripping portion 32 toward the initial position. In this example, when the rider shifts from a sitting posture to a standing posture while gripping the gripping portion 32, the rider can rotate the gripping portion 32 and the mounting portion 34 from the initial position in the clockwise direction as viewed in the axial direction from the right end 12 of the handlebar 10. The gripping portion 32 may be rotated to a maximum rotation position (FIG. 8) where the second stopper surface 46 contacts the projection 42. Then, when the rider releases his or her hand from the gripping portion 32, the gripping portion 32 may be rotated by the coil spring 70 in the counterclockwise direction as viewed in the axial direction from the right end 12 of the handlebar 10 and be automatically returned to the initial position (FIG. 7). Alternatively, the rider may return the gripping portion 32 to the initial position with a relatively weak force.

The coil spring 70 functions as a first biasing member that biases the gripping portion 32 about the rotational axis AX relative to the base portion 20. The coil spring 70 also functions as a second biasing member that biases the gripping portion 32 relative to the base portion 20 in the direction that reduces the overall length of the handlebar 10. This limits or reduces chattering of the gripping portion 32 in the axial direction. Further, the guide 48 pushes the projection 42 and stabilizes the rotation of the gripping portion 32.

A bicycle handlebar 10 according to a third embodiment of the present disclosure will now be described with reference to FIG. 10 focusing on the differences from the second embodiment.

The rotatable outer member 30 is rotatable relative to the base portion 20 about the rotational axis AX and movable to extend in the axial direction.

The guide 48 is a bent guide passage including first and second axial direction guide passages 48c and 48d, which are substantially parallel to the rotational axis AX, and a rotation direction guide passage 48e, which is parallel to the rotation direction of the gripping portion 32. First and second positioning mechanisms 50a and 50b are arranged in the guide 48.

The guide 48 and the projection 42 set the rotatable angle and extendible length of the rotatable outer member 30. The first view of FIG. 10 shows the gripping portion 32 in the initial position. Here, the projection 42 is located between the first positioning mechanism 50a and a first stopper surface 44 of the guide 48.

For example, when the rider shifts the gripping portion 32 in the outward axial direction, the gripping portion 32, which is guided by the first axial direction guide passage 48c and the projection 42, may be moved in the outward axial direction, that is, in a direction that increases the overall length of the handlebar 10. In accordance with the movement of the gripping portion 32, a positioner 52a of the first positioning mechanism 50a is pushed and elastically moved by the projection 42 (second view in FIG. 10).

Figure 10:
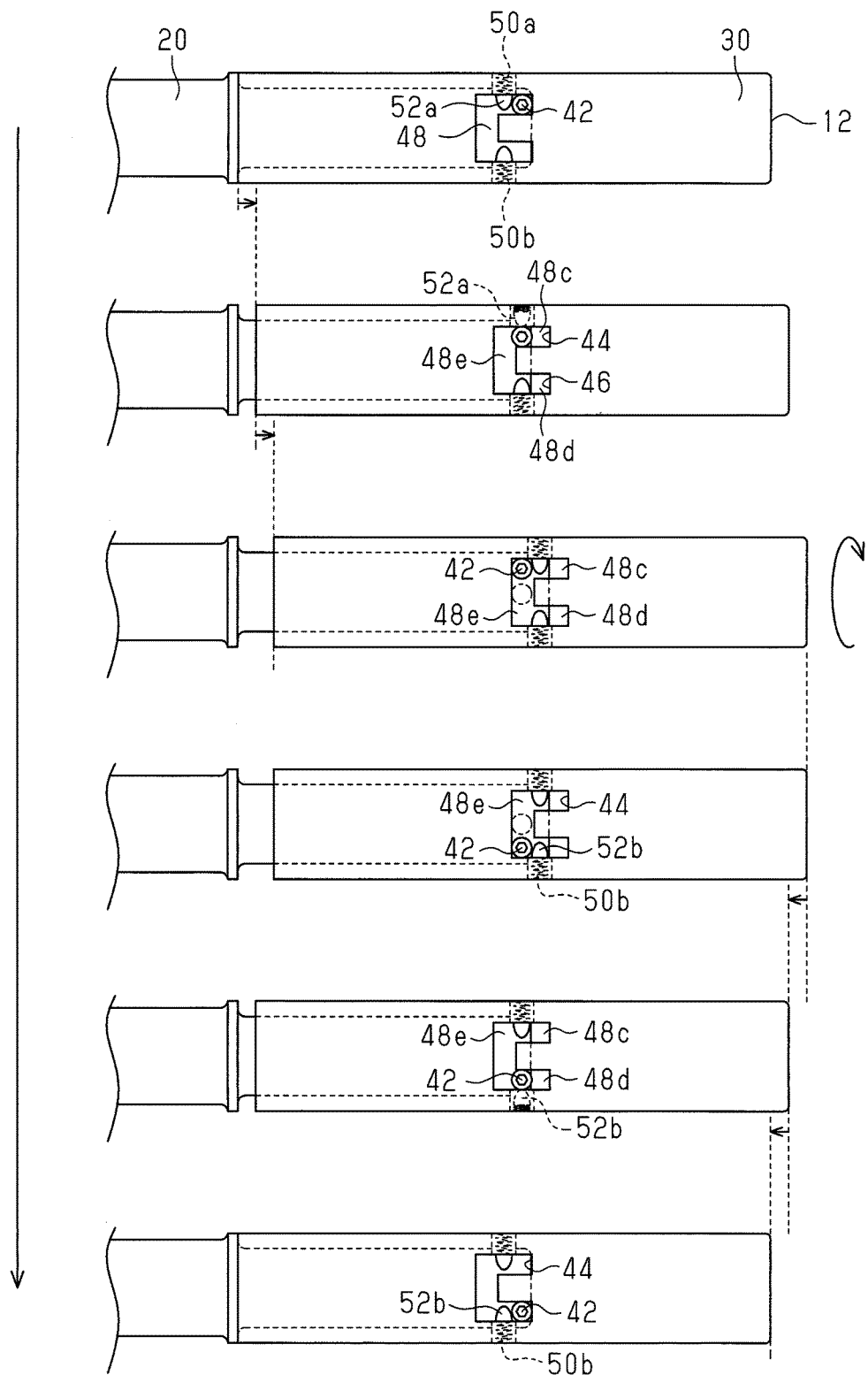
FIG. 10 is a schematic diagram according to a third embodiment.

As shown by the third view in FIG. 10, the gripping portion 32 may be moved in the outward axial direction until the corner of the first axial direction guide passage and the rotation direction guide passage contacts the projection 42. When the gripping portion 32 reaches the most extended position, the gripping portion 32 may be rotated in the clockwise direction as viewed in the axial direction from the right end 12 of the handlebar 10. The rotation direction guide passage and the projection 42 guide the rotation of the gripping portion 32.

When the gripping portion 32 reaches the maximum rotational angle position where the corner of the rotation direction guide passage and the second axial direction guide passage contacts the projection 42, the gripping portion 32 may be moved in the inward axial direction, that is, in a direction that decreases the overall length of the handlebar (fourth view in FIG. 4). The movement of the gripping portion 32 is guided by the second axial direction guide passage and the projection 42. In accordance with the movement of the gripping portion 32, a positioner 52b of the second positioning mechanism 50b is pushed and elastically moved by the projection 42 (fifth view in FIG. 10). When the projection 42 is located between the second positioning mechanism 50b and a second stopper surface 46 of the guide passage, the gripping portion 32 is held at a rotated position that differs from the initial position (sixth view in FIG. 10).

In addition to the advantages of the first and second embodiments, the third embodiment has the following advantage.

In addition to being held at the initial position, the gripping portion 32 and the mounting portion 34 may be held at a rotated position that differs from the initial position. Accordingly, the rider may hold the gripping portion 32 and the mounting portion 34 at a position selected from a plurality of (two or more) positions including the initial position and the rotated position.

Several selected embodiments have been described to describe the present invention. However, the present invention is not limited to the foregoing embodiments (or one or more aspects thereof). For example, the embodiments may be modified as described below.

The handlebar 10 of the second embodiment may include the positioning mechanisms 50, 50a, and 50b of the first and third embodiments.

The handlebar 10 of the first embodiment and/or the third embodiment may include a first biasing member and/or a second biasing member like the coil spring 70 of the second embodiment.

The operating member may be an operating member other than the brake lever 100. For example, when a shifter assembly including a shift lever is mounted to the mounting portion 34, the shifter assembly serves as an operating member. When a combination of a brake lever and a shift lever is mounted to the mounting portion 34, the brake lever and the shift lever serve as operating members.

The gripping portion 32 may include a smooth outer circumferential surface or an unsmooth outer circumferential surface. Further, the gripping portion 32 may be covered by a cover member or a skin member such as a handlebar tape or a rubber grip.

Preferably, the rotatable gripping portion 32 is arranged on the two ends of the handlebar 10 like in the illustrated examples. However, the rotatable gripping portion 32 may be arranged only on the right side or the left side of the handlebar 10.

The gripping portion 32 is not limited to a hollow cylindrical tube or a solid cylindrical column and may have any of a variety of shapes based on ergonomics. For example, the gripping portion 32 may include one or more protuberances. Preferably, the protuberance of the gripping portion 32 is designed to enable easy movement of the gripping portion 32 relative to the base portion 20.

The inner circumferential surface of the rotatable outer member 30 and/or the outer circumferential surface of the non-rotatable inner member 26 may be formed to facilitate smooth movement of the gripping portion 32 relative to the base portion 20. For example, the inner circumferential surface of the rotatable outer member 30 and/or the outer circumferential surface of the non-rotatable inner member 26 may include a friction reduction mechanism such as a lining and a bearing element. The friction reduction structure may be a groove that extends parallel to or diagonally intersects the rotational axis AX and is formed in the inner circumferential surface of the rotatable outer member 30 and/or the outer circumferential surface of the non-rotatable inner member 26.

The non-rotatable inner member 26 that functions as the support may be a hollow cylindrical tube or a solid cylindrical column having a uniform diameter. Alternatively, the non-rotatable inner member 26 may be a tapered hollow tubular body or a conical body.

The projection 42 may be any of various projections other than the head of a bolt or a pin as long as the rotational angle of the gripping portion 32 may be restricted within a predetermined range in cooperation with the stopper surfaces 44 and 46.

The first stopper surface 44 does not have to contact the projection 42 when the gripping portion 32 is located at the initial position. In some examples, the first stopper surface 44 may contact the projection 42 when the gripping portion 32 is rotated in a first direction from the initial position. In this case, it is preferred that the second stopper surface 46 contacts the projection 42 when the gripping portion 32 rotates from the initial position in a second direction.

One or both of the flange 24 of the base portion 20 and the positioning step 30a of the outer member 30 may be omitted.

In the second embodiment, the same coil spring 70 functions as the first biasing member, which biases the gripping portion about the rotational axis AX relative to the base portion 20, and the second biasing member, which biases the gripping portion 32 relative to the base portion 20 in a direction in which the overall length of the handlebar 10 decreases. The first biasing member and the second biasing member may be discrete biasing elements.

Figure 11:
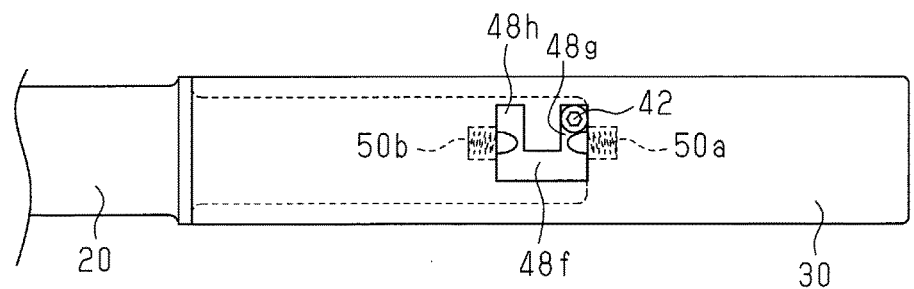
FIGS. 11 and 12 are schematic diagrams showing handlebars of modified examples.

The shape of the guide 48 and the location of the positioning mechanism 50 may be changed when required. For example, in the example of FIG. 11, the guide 48 is a bent guide passage including an axial direction guide passage 48f, which is substantially parallel to the rotational axis AX, and two rotation direction guide passages 48g and 48h, which are parallel to the rotation direction of the gripping portion 32. In this structure, the mounting portion 34 may be extended and rotated together with the gripping portion 32 relative to the base portion 20. Further, the gripping portion 32 and the mounting portion 34 may be positioned at a position selected from a plurality of different positions in the axial direction.

Figure 12:
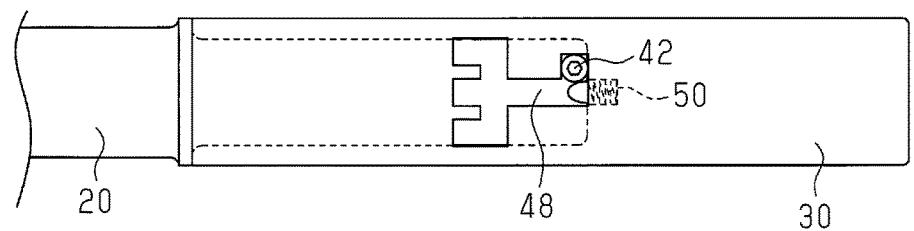

For example, as shown in FIG. 12, the guide 48 may be branched. Such a structure also allows the mounting portion 34 to be rotated together with the gripping portion 32 relative to the base portion 20. Further, the gripping portion 32 and the mounting portion 34 may be held at a position selected from a plurality of positions in the axial direction. Moreover, the gripping portion 32 and the mounting portion 34 may be held at a position selected from a plurality of different positions in the rotation direction.

The handlebar 10 is not limited to a flat bar and may have a different shape such as that of a riser bar.

It should be apparent to those skilled in the art that the present invention may be embodied in many other specific forms without departing from the spirit or scope of the invention. For example, some of the components may be omitted from all components disclosed in the embodiments. Further, components in different embodiments may be appropriately combined. The present invention is not to be limited to the details given herein, but may be modified within the scope and equivalence of the appended claims.

The invention claimed is:

1. A bicycle handlebar comprising:
   a base portion configured to be coupled to a bicycle;
   a gripping portion configured to be rotatably coupled to the base portion;
   a mounting portion to which an operating member that operates a component of the bicycle is mounted such that the gripping portion rotates together with the mounting portion and the operating member about a rotational axis relative to the base portion while maintaining the operating member in a non-actuated condition, wherein the gripping portion is a first portion of an outer circumferential surface of a tubular one-piece member, the mounting portion is a second portion of the outer circumferential surface of the tubular one-piece member, the second portion differs in location from the first portion in an axial direction, and diameters of the first and second portions are substantially equal; and
   a rotational restriction unit configured to restrict a rotational angle of the gripping portion relative to the base portion to within a predetermined range,
   wherein the rotational restriction unit includes a projection arranged on one of the base portion and the gripping portion, and a stopper surface arranged on the other one of the base portion and the gripping portion, wherein the stopper surface is shaped to contact the projection when the gripping portion rotates.

2. The bicycle handlebar according to claim 1, comprising a positioning mechanism configured to position the gripping portion and the mounting portion relative to the base portion about the rotational axis.

3. The bicycle handlebar according to claim 1, comprising:

a first biasing member configured to bias the gripping portion relative to the base portion about the rotational axis.

4. The bicycle handlebar according to claim 3, wherein the base portion includes a flange configured to abut axially against an inner end of the mounting portion, and a support that extends in an axial direction from the flange and supports the gripping portion from an inner side in a radial direction, wherein the first biasing member is arranged inside the support.

5. The bicycle handlebar according to claim 3, wherein the first biasing member biases the gripping portion in a counterclockwise direction as viewed from a right end of the handlebar in the rotational axis direction.

6. The bicycle handlebar according to claim 1, wherein the rotational restriction unit includes a guide configured to guide the projection at least about the rotational axis, and the stopper surface is disposed at the guide.

7. The bicycle handlebar according to claim 6, comprising a positioner configured to position the projection at a predetermined position in the guide.

8. The handlebar according to claim 7, wherein the positioner is movable between a first position where the positioner positions the projection and a second position where the positioner permits movement of the projection relative to the guide.

9. The bicycle handlebar according to claim 8, wherein the positioner is biased to be located at the first position, and when the gripping portion moves the positioner is pushed by the projection to the second position.

10. The bicycle handlebar according to claim 8, comprising a restriction member detachably engaged with the guide, the restriction member being configured to restrict movement of the projection relative to the guide.

11. The bicycle handlebar according to claim 1, wherein the gripping portion is integrally arranged with the mounting portion.

12. A bicycle handlebar comprising:

a base portion configured to be coupled to a bicycle;

a gripping portion configured to be rotatably coupled to the base portion, wherein the gripping portion is movable in an axial direction relative to the base portion;

a mounting portion to which an operating member that operates a component of the bicycle is mounted such that the gripping portion rotates together with the mounting portion and the operating member about a rotational axis relative to the base portion while maintaining the operating member in a non-actuated condition, wherein the gripping portion is a first portion of an outer circumferential surface of a tubular one-piece member, the mounting portion is a second portion of the outer circumferential surface of the tubular one-piece member, the second portion differs in location from the first portion in an axial direction, and diameters of the first and second portions are substantially equal; and a torsion spring configured to bias the gripping portion relative to the base portion in a direction that decreases an overall length of the handlebar and to bias the gripping portion relative to the base portion about the rotational axis.

* * * * *